US012776736B2

(12) United States Patent
Wagner et al.

(10) Patent No.: US 12,776,736 B2
(45) Date of Patent: Oct. 27, 2026

(54) TRANSPORT DEVICE IN THE FORM OF A LONG-STATOR LINEAR MOTOR

(71) Applicant: B&R INDUSTRIAL AUTOMATION GMBH, Eggelsberg (AT)

(72) Inventors: Philipp Wagner, Eggelsberg (AT); Martin Haudum, Eggelsberg (AT); Joachim Weißbacher, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 492 days.

(21) Appl. No.: 18/039,643

(22) PCT Filed: Nov. 30, 2021

(86) PCT No.: PCT/EP2021/083460
§ 371 (c)(1),
(2) Date: May 31, 2023

(87) PCT Pub. No.: WO2022/117524
PCT Pub. Date: Jun. 9, 2022

(65) Prior Publication Data

US 2024/0088809 A1 Mar. 14, 2024

(30) Foreign Application Priority Data

Dec. 1, 2020 (AT) .............................. A 51047/2020

(51) Int. Cl.
*H02P 25/06* (2016.01)
*B65G 54/02* (2006.01)
(Continued)

(52) U.S. Cl.
CPC .............. *H02P 25/06* (2013.01); *B65G 54/02* (2013.01); *H02K 9/22* (2013.01); *H02P 1/16* (2013.01); *H02K 2213/03* (2013.01)

(58) Field of Classification Search
CPC ...... H02K 41/03; H02K 41/031; H02K 41/02; H02K 9/22; H02K 2213/03; H02P 25/06; H02P 1/16; B65G 54/02
See application file for complete search history.

(56) References Cited

U.S. PATENT DOCUMENTS 5,783,877 A 7/1998 Chitayat
7,282,821 B2 10/2007 Kubo et al.
(Continued)

FOREIGN PATENT DOCUMENTS

DE 10 2012 025326 6/2014
DE 10 2018 004 905 1/2019
(Continued)

OTHER PUBLICATIONS

18039643_2025-05-26_EP_3251985_A1_H.pdf (Year: 2025).*
(Continued)

*Primary Examiner* — Christopher M Koehler
*Assistant Examiner* — Ahmed F Seck
(74) *Attorney, Agent, or Firm* — GREENBLUM & BERNSTEIN, P.L.C.

(57) ABSTRACT

In order to simplify the starting-up of a transport device in the form of a long-stator linear motor, a thermal design and/or an electrical design and/or a mechanical design of the transport device is checked using a time course of the electrical control variable of the drive coils for producing a product flow, and, before starting-up, a transport device configuration having a thermal and/or electrical and/or mechanical configuration is changed if the product flow cannot be implemented due to the thermal design and/or electrical design and/or mechanical design.

7 Claims, 2 Drawing Sheets

(51) Int. Cl.
*H02K 9/22* (2006.01)
*H02P 1/16* (2006.01)

(56) References Cited

U.S. PATENT DOCUMENTS

| | | | |
|---|---|---|---|
| 9,202,719 B2 | 12/2015 | Lu et al. | |
| 10,913,362 B2 * | 2/2021 | Holzleitner | B60L 13/003 |
| 11,038,410 B2 | 6/2021 | Brinkmann et al. | |
| 2015/0008768 A1 * | 1/2015 | Achterberg | B65G 54/02 310/12.11 |
| 2017/0346380 A1 * | 11/2017 | Weber | B60L 15/38 |
| 2019/0002214 A1 * | 1/2019 | Weber | H02P 25/06 |
| 2019/0077277 A1 * | 3/2019 | Holzleitner | H02P 25/064 |
| 2019/0097514 A1 | 3/2019 | Takamizawa | |
| 2021/0237981 A1 * | 8/2021 | Huber | B61L 25/026 |

FOREIGN PATENT DOCUMENTS

| | | | |
|---|---|---|---|
| DE | 10 2018 215 911 | 3/2019 | |
| DE | 10 2017 131 324 | 6/2019 | |
| EP | 3 109 998 | 12/2016 | |
| EP | 3 173 363 | 5/2017 | |
| EP | 3 251 985 | 12/2017 | |
| EP | 3251985 A1 * | 12/2017 | B60L 13/10 |
| EP | 3 385 110 | 10/2018 | |
| EP | 3 457 560 | 3/2019 | |
| EP | 3 575 250 | 12/2019 | |
| EP | 3 378 166 | 3/2022 | |
| WO | 2015/042409 | 3/2015 | |
| WO | 2018/176137 | 10/2018 | |

OTHER PUBLICATIONS

Austria Search Report conducted in counterpart Austria Application No. A 51047/2020 (Dec. 1, 2021).

Int'l Search Report (Form PCT/ISA/210) conducted in Int'l Application No. PCT/EP2021/083460 (Nov. 2, 2022).

Int'l Written Opinion Report (Form PCT/ISA/237) conducted in Int'l Application No. PCT/EP2021/083460 (Nov. 2, 2022).

Int'l Prelim. Report (Form PCT/IPEA/409) conducted in Int'l Application No. PCT/EP2021/083460 (Mar. 29, 2023).

* cited by examiner

TRANSPORT DEVICE IN THE FORM OF A LONG-STATOR LINEAR MOTOR

CROSS-REFERENCE TO RELATED APPLICATIONS

The present application is a U.S. National Stage of International Patent Application No. PCT/EP2021/083460 filed Nov. 30, 2021, and claims priority of Austria Patent Application No. A 51047/2020 filed Dec. 1, 2020.

BACKGROUND OF THE INVENTION

1. Field of the Invention

The present invention relates to a method for starting-up a transport device in the form of a long-stator linear motor comprising a plurality of drive coils which are arranged on a stator and a plurality of transport units which are moved simultaneously along the stator during operation, a transport unit being used to convey a product, and a specified product flow being produced by the transport device by creating, using specified rules for the movements of the transport units during the operation of the transport device, movement profiles of the movements of the transport units along the stator for producing the product flow.

2. Discussion of Background Information

In a linear motor, a primary part (stator) is provided and a secondary part (rotor) is provided which is arranged so as to be movable relative to the primary part. Drive coils are arranged on the primary part and drive magnets are arranged on the secondary part, or vice versa. The drive magnets are designed as permanent magnets, electrical coils or short-circuit windings. The drive coils are electrical coils that are energized to generate an electromagnetic field by applying a coil voltage. Due to the interaction of the (electro)magnetic fields of the drive magnets and the drive coils, forces act on the secondary part, which forces move the secondary part relative to the primary part. The linear motor can be designed, for example, as a synchronous machine or as an asynchronous machine. The drive coils of the linear motor are arranged either along a direction of movement or in a plane of movement. The secondary part can be moved along this one direction of movement or freely in the plane of movement in the two directions of movement. A distinction can also be made between short-stator linear motors and long-stator linear motors, in the long-stator linear motor the secondary part being shorter or smaller than the primary part, and in the short-stator linear motor the primary part being shorter or smaller than the secondary part.

The invention relates to long-stator linear motors, which expressly include linear long-stator linear motors (with movement in a direction of movement) and planar long-stator linear motors (with movement in a plane of movement, often also called planar motor). In long-stator linear motors, a plurality of secondary parts are usually moved simultaneously and independently of one another along the primary part (in a direction of movement or in a plane of movement). Long-stator linear motors are therefore often used in electromagnetic transport systems in which a plurality of transport units (secondary parts) for carrying out transport tasks are moved simultaneously.

Long-stator linear motors are known from the prior art. In a long-stator linear motor, drive coils are arranged one behind the other in a direction of movement or next to one another in a movement plane along a support structure. The drive coils arranged on the support structure form the stator of the long-stator linear motor, which stator extends over the movement path. Drive magnets, either permanent magnets or electromagnets, are arranged on a rotor and generate a magnetic excitation field. In a transport device, the rotor functions as a transport unit for moving an object. If the drive coils are energized in the region of a rotor, an electromagnetic drive magnetic field is generated which interacts with the excitation field of the drive magnets to generate a driving force on the rotor. By controlling the energization of the drive coils, a moving drive magnetic field can be generated, by means of which the rotor can be moved in the direction of movement or in the plane of movement of the long-stator linear motor. The advantage is that a large number of rotors can be moved independently of one another on the stator at the same time. In this context, it is already known to construct a long-stator linear motor in a modular manner by means of stator modules. A particular number of drive coils are arranged on a stator module. Individual stator modules are then joined together to form a stator of the desired length and/or shape. For example, WO 2015/042409 A1 discloses such a modularly constructed linear long-stator linear motor. U.S. Pat. No. 9,202,719 B1 discloses a long-stator linear motor in the form of a planar motor comprising stator modules.

By energizing the drive coils by applying a coil voltage, heat is also generated in the stator modules, as a result of which the temperature of a stator module can rise. It is therefore already known to cool the stator of a linear motor. For example, U.S. Pat. No. 5,783,877 A or U.S. Pat. No. 7,282,821 B2 discloses cooling of a stator of a linear motor with conduits that are arranged in the stator or in a component in contact with the stator, through which conduits a coolant is conducted. The coolant thus absorbs heat from the stator and dissipates it.

The cooling of the stator of a long-stator linear motor, which stator can extend over a great length, is, however, structurally complex and also increases the costs, in particular for long stator lengths such as when used as a transport device.

A stator of a planar motor usually also has to be cooled, in particular because in a planar motor a transport unit is held so as to levitate above the stator by electromagnetic forces, this taking place by appropriately energizing the drive coils. Not only the driving forces for moving the transport units but also the levitating forces have to be generated by means of the drive coils. An example of cooling the stator of a planar motor can be found in DE 10 2017 131 324 A1.

To energize the drive coils, power electronics are provided which implement the required electrical control variables of the drive coils, for example a coil voltage, a coil current or a magnetic flux. In the power electronics, electrical component parts are built in that are loaded during operation, for example by electrical currents flowing therethrough. However, the permissible electrical currents are limited by the component parts and/or the electrical configuration of the power electronics.

During the movement of a transport unit along the stator, forces and moments also act on the transport unit due to the kinematics of the movement (position, speed, acceleration, jerk (time derivative of acceleration) and shock (double time derivative of acceleration) over time). These forces are also influenced by the load on the transport unit (mass and position of the object to be conveyed). Driving forces also act which serve to move the transport unit, for example along the direction of movement and transversely thereto or along a path in a plane of movement or normally thereto. In a planar motor, the drive coils also generate a levitating force which acts on the transport unit and which allows a transport unit to levitate magnetically above the plane of movement. In particular in a linear long-stator linear motor, forces and moments can also act on the transport unit which have to be absorbed by the mechanical guide of the transport unit in order to prevent the transport unit from flying off the transport route during movement. For example, centrifugal forces act on the transport unit in a curve, which forces attempt to lift the transport unit off the transport route. When the transport unit moves in a plane of movement, tilting moments, for example, can act due to the load, which moments attempt to lift the transport unit off the transport route. Centrifugal forces can also act in a planar motor in the region of a curved plane of movement. External forces can also act on a transport unit, for example process forces in a processing station for processing a product conveyed by the transport unit.

The guidance of the transport unit along the transport route can be mechanical, for example by means of interacting mechanical guide parts on the transport unit and the transport route (such as rollers, sliding surfaces, balls, etc.), but can also be magnetic, for example due to the drive magnets on the transport unit, which interact with magnetic parts of the guide structure. A combination of such guides is also conceivable. The guide in a linear long-stator linear motor is usually mechanical and magnetic. A guide for a transport unit of a linear long-stator linear motor is disclosed, for example, in EP 3 457 560 A1. In a planar motor, a mechanical guide is usually not provided, or is only provided in sections, and instead a transport unit is guided on the basis of electromagnetic levitation forces. A guide for a transport unit of a planar long-stator linear motor is disclosed, for example, in WO 2018/176137 A1.

Last but not least, the electrical power supply to the drive coils of the long-stator linear motor also has to be ensured during operation. Due to the large spatial extent of a long-stator linear motor and due to the large number of built-in drive coils, the electrical power supply is usually provided by a plurality of electrical feed sources, each feed source supplying a plurality of drive coils with electrical energy. Transient movements of the transport units (accelerations, decelerations) are particularly critical for the electrical power supply, because higher electrical powers are required therefor than for movements at constant speed. Especially when a large number of transport units are accelerated at the same time (for example after a stop or an emergency stop), high levels of electrical power can be required. In the case of a planar motor, the electromagnetic levitation of the transport units also requires a large amount of electrical energy. In the case of electromagnetic switches realized by the drive coils, more electrical energy is also required for the electromagnetic switch setting, because, in addition to the forces in the direction of movement, the drive coils also have to generate forces transversely thereto.

Last but not least, the state of wear of the transport units can also influence the electrical energy required. If, for example, the friction between the transport unit and the guide structure increases due to wear, higher forces may be required for the movement and thus more electrical energy may be required for the movement.

For a long-stator linear motor, it is therefore important that undisturbed operation is ensured by means of the thermal design (cooling), the mechanical design (acting forces and moments), and the electrical design (electrical power supply to the drive coils, power electronics for generating the electrical control variables of the drive coils) for the relevant application and the relevant long-stator linear motor.

SUMMARY

It is therefore an object of the present invention to simplify the start-up of a transport device in the form of a long-stator linear motor.

According to the invention, this object is achieved by the features of independent claim 1. A thermal design and/or an electrical design and/or a mechanical design of the transport device is thus checked using a time course of the electrical control variables of the drive coils for producing a product flow, and, before starting-up, a transport device configuration with a thermal and/or electrical and/or mechanical configuration is changed if the product flow cannot be implemented due to the thermal design and/or the electrical design and/or the mechanical design. By checking the thermal, mechanical and electrical configuration of a transport device in a transport device configuration, it is possible to check even before the transport device is actually started-up whether an intended product flow can actually be produced with the transport device configuration. If the product flow cannot be produced, the transport device configuration can be changed until the product flow can be implemented. In this way, possible problems in the implementation of the product flow can be identified before starting-up and can be eliminated by changing the transport device configuration, so that no further problems during operation, or at least only a few problems, can be expected after starting-up. This means that a transport device can be put into operation much more easily and efficiently than before. A transport device can also be designed with this approach.

The steps of determining the mechanical, electrical or thermal state and of changing the transport device configuration can be repeated, if necessary, until the process flow can be implemented with the current transport device configuration. Starting-up can thus be carried out very reliably, and interdependencies of changes in the configurations of the transport device configuration that are not immediately identifiable can also be identified and eliminated.

The time course of the electrical control variables of the drive coils is advantageously specified by simulating the movements of the transport units for producing the process flow and, in the process, determining the electrical control variables of the drive coils required to implement the movements. In this case it is advantageous if this step of the checking is also repeated. The simulation allows various assumptions and specifications for the product flow to be taken into account, so that the check can advantageously be limited only to certain particularly critical cases.

Further advantageous embodiments and advantages of the invention can be found in the dependent claims and in the following description of the invention.

BRIEF DESCRIPTION OF THE DRAWINGS

The present invention will be described in more detail in the following with reference to FIGS. 1 and 2, which schematically show, in a non-limiting manner, advantageous embodiments of the invention by way of example. In the drawings.

DETAILED DESCRIPTION

Figure 1:
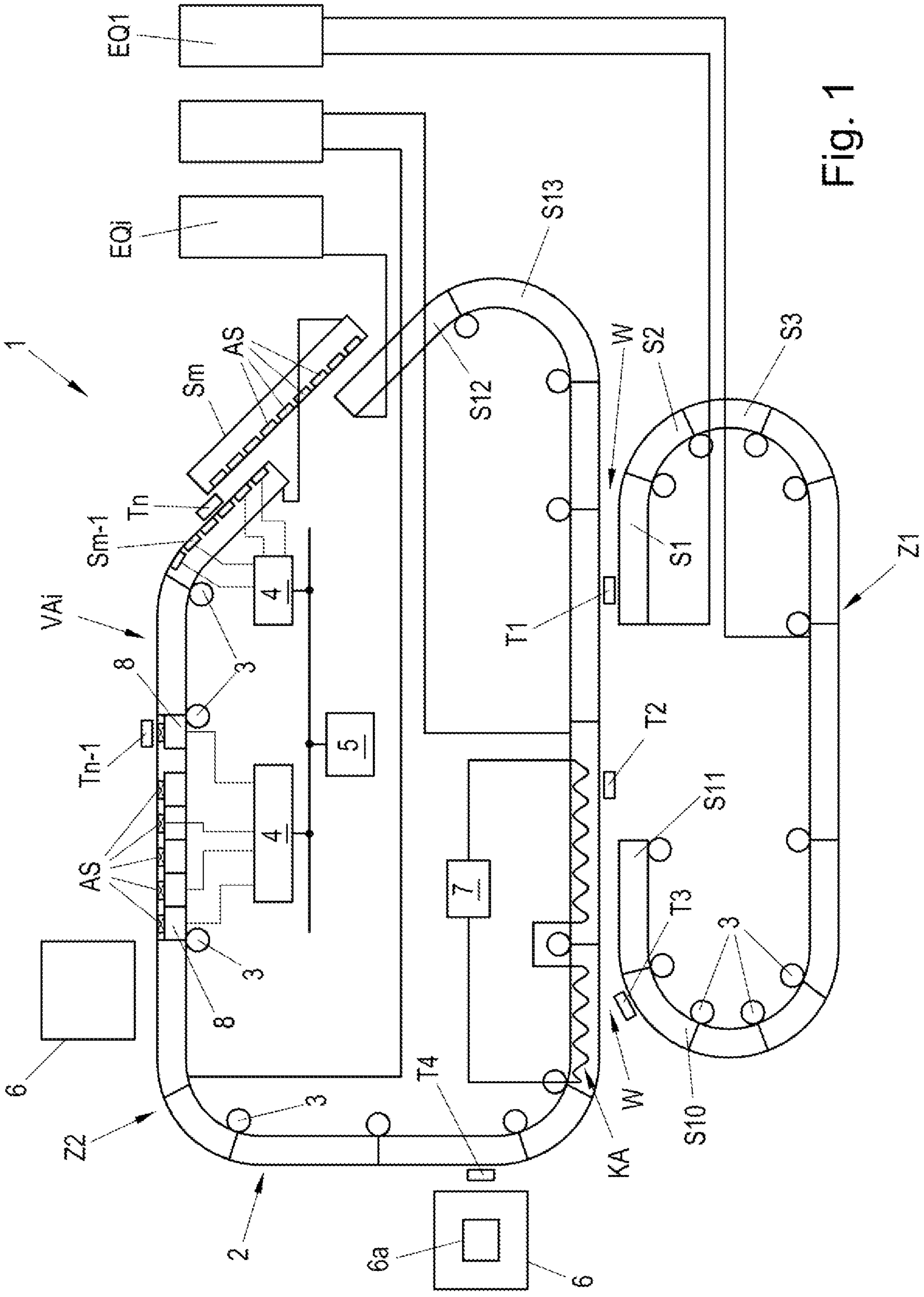
FIG. 1 shows an embodiment of a transport device in the form of a long-stator linear motor and FIG. 2 shows a flow diagram of the start-up of the transport device with a long-stator linear motor.

FIG. 1 shows a transport device 1 in the form of a linear long-stator linear motor, with reference to which the invention is described in the following without limitation of generality. The transport device 1 usually consists of a plurality of separate stator modules Sm, where m>1 (for reasons of clarity, not all of the stator modules are denoted in FIG. 1), which modules are assembled to form a stator 2 of the long-stator linear motor. For this purpose, the stator modules Sm can be arranged on a preferably stationary support structure (not shown for reasons of clarity). A large number of drive coils AS is arranged on the stator 2. A plurality of drive coils AS is usually arranged on a stator module Sm (only shown for some of the stator modules Sm in FIG. 1 for reasons of clarity). The stator 2 forms the possible transport path of the transport device 1 for a number of transport units Tn, where n>1, along which path the transport units Tn can be moved. The transport path can be closed or open. The transport path can also have different branches Zk, where k≥1, which in turn can be open or closed. Branches Z1, Z2 of the transport path can be interconnected by switches W so that a transport unit Tn can change from one branch Z1 to another branch Z2 and there be moved further. The switch W can be mechanical or also electromagnetic, as described, for example, in EP 3 109 998 B1. The electromagnetic switch setting in the switch can be carried out by means of the drive coils AS (as in EP 3 109 998 B1) and/or by means of additional switch coils. In a planar long-stator linear motor, the transport path of the transport units Tn can be selected in the plane of movement.

The stator modules Sm can also be designed in different geometric shapes, for example straight line modules or curve modules, in order to be able to produce transport paths having different geometries. There are no limits to the geometry of a transport path and the transport path can be in one plane or anywhere in space.

It is also possible for the transport path to be formed in portions from a conveyor device other than a long-stator linear motor. For example, a return route for the transport units Tn can be designed as a simple conveyor belt, because there are no demands on the accuracy of the movement for the return. It is also possible to combine a linear and a planar long-stator linear motor. For example, a planar long-stator linear motor could be provided in the region of processing stations that are interconnected by linear long-stator linear motors.

The control of the movement of a transport unit Tn by a control unit 4 and the associated actuation of the drive coils AS involved and position detection of the transport unit Tn along the transport path are also well known, for example from EP 3 385 110 A1 and EP 3 376 166 A1. Usually, a plurality of control units 4 are provided, each of which control a number of drive coils AS and which are connected to a higher-level system control unit 5 (for example by a data communication bus), as indicated in FIG. 1.

The design of the transport units Tn can also be arbitrary and different transport units Tn can also be moved on the transport device 1, for example transport units Tn of different sizes or transport units Tn having different product receptacles for conveying different products or products in different manufacturing stages.

A number of processing stations 6 can also be provided along the transport path. A product conveyed by a transport unit Tn can be processed in a processing station 6. In principle, any processing can be provided, which can be, for example, a certain manufacturing or assembly step on the product, a change in the orientation of the product on the transport unit Tn, a filling process, a measurement on the product, an examination of the product, etc. The processing devices 6*a* required for this purpose are provided in the processing station 6. The transport unit Tn can be stopped in the processing station 6, or the processing can also take place in the processing station 6 while the transport unit Tn is moving. The product can also be removed from the transport unit Tn for processing and then placed back onto the same or a different transport unit Tn. A processing station 6 can also be used for the inward transfer of products or the outward transfer of products. During the inward transfer, a product is placed on a transport unit Tn and, during the outward transfer, said product is removed from the transport unit Tn. At the time of the outward transfer, the product is usually finished or has arrived at the planned end position, or it is removed as waste.

By energizing drive coils AS with a coil current (e.g., by applying a coil voltage) in the region of a transport unit Tn, a drive magnetic field is generated which interacts in a known manner with drive magnets on the transport unit Tn (not shown in FIG. 1 for reasons of clarity), in order to move the transport unit Tn in a desired manner. To move the transport unit Tn, the drive magnetic field is moved further in the direction of movement by appropriate control of the drive coils AS. For this purpose, a control unit 4 determines, in each time step of the control of the movement of the transport unit Tn, for example in the millisecond range, the required electrical control variables of the drive coils AS which are actively involved in the movement of the transport unit Tn, for example the coil voltages to be applied of these active drive coils AS.

As a result of the interaction of the drive magnetic field and the drive magnets, driving forces act on the transport unit Tn, which forces can also act in such a way that moments act on the transport unit Tn. If, for example, drive magnets are provided on both sides of the transport unit Tn as seen in the direction of movement, and drive coils AS are provided on both sides of the stator 2, then different driving forces can be generated in the direction of movement on the two sides, which forces then produce a moment on the transport unit Tn. With an appropriate arrangement of the drive coils AS and drive magnets, driving forces can be generated in all or some spatial directions. A driving force usually acts in the direction of movement in order to move the transport unit Tn forward. Often, driving forces are also generated transversely to the direction of movement, for example for electromagnetic switch setting in a switch or to compensate for external forces. In a planar long-stator linear motor 1, driving forces are also generated normally to the plane of movement in order to keep the transport unit Tn levitated.

The driving forces are used to realize with the transport unit Tn a particular movement profile of the movement of the transport unit Tn, for example having particular kinematic variables such as positions, speeds, accelerations, jerks, etc. A movement profile is a time course of such kinematic variables or, equivalently, a curve of such kinematic variables over the position of the transport unit Tn along the stator 2.

The movement of a transport unit Tn along the stator 2 is often not deterministic, i.e., it cannot be said in advance when which transport unit Tn will be at which position of the stator 2 or what speed or acceleration a transport unit Tn has at a particular point in time or at a particular position. There can be many reasons for this, some of which are mentioned below as examples. For example, a switch arbitration is required at a switch W, as a result of which it is determined which transport unit Tn is allowed to travel through the switch W if two transport units Tn want to travel through a switch W at the same time. It may be that identical processing stations 6 are provided on different branches Zk or sections of the stator 2 in order to increase the possible product flow. Which product, and thus which transport unit Tn, is directed to which processing station 6, is determined by a higher-level controller using certain criteria (for example a number of waiting transport units Tn upstream of a processing station 6). By means of collision monitoring, it can be ensured that transport units Tn traveling one behind the other do not collide with one another. The movement of one of the transport units Tn traveling one behind the other can be changed according to specified criteria in order to avoid a collision. Products can be buffered in a buffer until a processing station 6 becomes free. Random quality checks can also be provided, with any product moving on a transport unit Tn being removed from the product flow and subjected to a quality check. It can then be reintegrated into the product flow. The movement profiles of the transport units Tn involved in the implementation of the product flow are accordingly created according to specified rules for the movements of the transport units Tn. The specified rules are used to control the movement of the transport units Tn, that is to say how the transport units Tn are to be moved along the stator 2.

For this reason, a desired product flow is often set in a transport device 1 in the form of a long-stator linear motor, for example in a higher-level controller, such as in the system control unit 5. The product flow only specifies particular positions along the stator 2, which positions are to be reached by a transport unit Tn, for example from a start position (e.g., an inward transfer point) to an end position (e.g., an outward transfer point), or a switch to be approached. Between the start position and the end position, certain processing steps can also be provided in the product flow, which steps are to be carried out at the processing stations 6 provided. The transport unit Tn can be moved between these positions in any possibly way within the framework of the specified rules for the movements of the transport units Tn. The product is moved along the stator 2 on a transport unit Tn, for example under the control of the system control unit 5, in order to produce the product flow. For this purpose, the system control unit 5 can determine a target movement variable, for example a target position or target speed, for each of the moving transport units Tn in specified time steps, for example in the millisecond range, which target variable is to be implemented by each of the moving transport units Tn in this time step. From the target movement variables determined in this way, the control units 4 then determine electrical control variables, for example coil currents, coil voltages or magnetic fluxes, by means of which the active drive coils AS involved in the movement of the transport units Tn are energized in order to set the target movement variable in the relevant time step.

A control unit 4 and a system control unit 5 can be implemented as a microprocessor-based hardware unit on which the corresponding software is executed. Implementation as an integrated circuit, such as an application-specific integrated circuit (ASIC) or field programmable gate array (FPGA), or programmable logic controller (PLC) is also possible. It can be provides one hardware unit, or the control of the movement of the transport units Tn and/or the actuation of the drive coils AS can also be divided between a plurality of hardware units.

The product flow can generally be produced with a number of different routes and with different movement profiles of the transport units Tn. A movement profile describes the kinematics of the movement of the transport unit Tn, i.e., in particular the movement variables position, speed and/or acceleration (and optionally also other time derivatives thereof) over time, for example in each time step of the control of the movement of a transport unit Tn. In the case of speed or acceleration (or other time derivatives thereof), the kinematics can also be described as a function of the position on the stator 2. For example, a processing step can be carried out on a plurality of identical processing stations 6, with a decision as to which processing station 6 is approached being made only during the movement of the product on the transport unit Tn. Or a particular position on the stator 2 can be reached by several routes, with a decision as to which route is taken being made only during the movement of the product on the transport unit Tn. The movement profile can also be influenced by collision avoidance and other higher-level control algorithms.

However, the lack of determinism of the movement of the transport units Tn makes starting-up of a transport device 1 in the form of a long-stator linear motor considerably more difficult, because it is sometimes only after start-up that it turns out that the transport device configuration of the transport device 1 is not suitable for allowing the desired product flow with the transport units Tn.

The transport device configuration includes the mechanical configuration of the long-stator linear motor and/or the thermal configuration of the long-stator linear motor and/or the electrical configuration of the long-stator linear motor, i.e., how, with what components and/or with what restrictions the transport device 1 is constructed mechanically and/or thermally and/or electrically.

The mechanical configuration includes, for example, the geometry of the transport device 1 in space, or more specifically the geometry of the stator 2 and/or the transport units Tn, optionally also of the product receptacles on the transport units Tn, and/or a force specification (which can also include a moment specification) of permissible forces acting on the transport unit Tn (which can also include moments) and/or permissible movement parameters of the transport units Tn. The thermal configuration includes, for example, cooling of the stator 2 or parts thereof. The electrical configuration of the long-stator linear motor includes, for example, the electrical power supply to the drive coils AS of the stator 2 and/or a configuration of power electronics for the electrical power supply to the drive coils AS.

A permissible movement parameter can be, for example, a maximum permissible movement variable of a transport unit Tn, such as a maximum permissible speed or a maximum permissible acceleration. At least one permissible movement parameter can be specified for each individual transport unit Tn, or for the same types of transport units Tn, or for particular products to be conveyed. It is also possible to make a permissible movement parameter dependent on the conveyed mass and/or on the geometry of the stator 2. For example, a lower permissible speed can be specified when a larger mass is being conveyed. A lower permissible speed can be specified in a curve than on a straight portion of the transport path.

The configuration of power electronics can include, for example, permissible electrical power values of particular parts or components of the power electronics, for example maximum permissible electric currents that flow through certain parts or components.

To generate a moving drive magnetic field in order to move a transport unit Tn to produce a movement profile, drive coils AS in the region of the transport unit Tn are energized with a coil current by applying a coil voltage. The power loss of the drive coils AS generates heat which heats the stator 2 or the stator modules Sm of the stator 2. The heating of the stator 2 depends, among other things, on the movement profile but also on the number of movement cycles per unit of time. The movement profile, for example a speed-time course or a position-time course along the stator 2, is largely dependent on the product flow to be implemented, which product flow is to be produced by the transport device 1. The movement profile can be created by the system control unit 5 and can include accelerations (also in the sense of decelerations), stops, starts, constant speed phases, speed ramps, etc. along the stator 2, for example. However, the heating also depends on other influences, such as switch arbitration, collision avoidance, the distance between transport units Tn traveling one behind the other, i.e., depends largely on the implementation of the product flow by the system control unit 5. The number of movement cycles per unit of time is the number of transport units Tn per unit of time which travel over a particular portion of the stator 2. The more movement cycles per unit of time, the more often the drive coils AS have to be energized. The heat generation can therefore be very different along the stator 2, for example in the various stator modules Sm of the stator 2 or in individual drive coils AS, during the operation of the transport device 1.

A movement profile that requires high coil currents, for example due to high accelerations or high transported mass or in the region of an electromagnetic switch for switch setting, but is only very rarely executed on a stator module Sm, will rarely lead to a thermal problem because the stator module Sm has sufficient time to passively dissipate the generated heat, for example via heat conduction into the support structure or heat radiation into the environment. However, if this movement profile is frequently executed on a stator module Sm, the heat generated thereby can possibly no longer be easily and passively dissipated. Even a movement profile that requires relatively low currents can lead to thermal problems if the number of movement cycles is sufficiently high.

A thermal problem is understood here in particular as a thermal load on the stator 2 or on a stator module Sm, but also on individual drive coils AS, at which a specified maximum temperature is exceeded, at which temperature a component of the stator 2 or of the stator module Sm, such as the coil winding, the insulating varnish, the casting compound surrounding the drive coils AS, an electronic component, etc., would be damaged or even destroyed.

An active cooling 7 of the stator 2, for example particular stator modules Sm, is therefore often provided at particular points on the transport device 1 (FIG. 1). A section of the stator 2 that is actively cooled is also called a cooling section KA. The cooling 7 can be implemented in different ways. The active cooling 7 comprises, for example, a cooling circuit which circulates a cooling medium through a cooling section KA of the stator 2 in order to absorb heat and to dissipate said heat from the stator 2 (as in the example according to FIG. 1). The cooling 7 can, however, also take the form of a heat sink having a fan or having thermoelectric modules. A provided active cooling 7 has a known cooling capacity. For passive cooling, in contrast, the cooling takes place purely through the resulting natural heat conduction into other cooler components and/or by means of thermal radiation into the environment.

A plurality of active coolings 7 can be provided along the transport path, each of which cools a cooling section KA. A cooling 7, for example a cooling circuit, can also actively cool a plurality of stator modules Sm or only a part of a stator module Sm. A cooling circuit of an active cooling 7 can be routed in series through a plurality of cooling sections KA (as in FIG. 1), but can also cool a plurality of cooling sections KA of the stator 2 in parallel.

The electrical coil voltages for energizing the drive coils AS are generated by power electronics 8 (indicated in FIG. 1 for some of the drive coils AS). The power electronics 8 therefore have to be able to provide the required electrical power (voltages, currents) at any point in time. The power electronics 8 usually include power converters (for example in the form of half-bridge or full-bridge circuits having semiconductor switches) for generating the electrical currents or voltages, but also other electrical components such as filters, current balancers for a group of drive coils AS, etc. The load on the power electronics 8, in particular due to flowing electrical currents, of course also depends largely on the movement profiles of the transport units Tn.

The electrical energy for energizing the drive coils AS is provided by a number of electrical feed sources EQi, where $i \geq 1$ (FIG. 1), with each feed source EQi supplying electrical energy to a power supply section VAi of the stator 2, corresponding to a number of drive coils AS of the stator 2. For example, each feed source EQi supplies a number of stator modules Sm with electrical energy, each stator module Sm comprising a number of drive coils AS. The stator modules Sm supplied with power by a feed source EQi can be interconnected in series by electrical connections 3, as shown in FIG. 1. A feed source EQi can of course only provide a certain maximum electrical power $P_{maxi}$, which is known. The more transport units Tn are moved simultaneously on a power supply section VAi of the stator 2, the more electrical power the feed source EQi of this power supply section VAi has to provide for energizing the drive coils AS of this power supply section VAi. Likewise, movements with an acceleration of the transport unit Tn or transport units Tn having a higher load (mass of the conveyed product) require more electrical power than movements with a constant speed of the transport unit Tn. The same applies to increased friction between the stator 2 and a transport unit Tn, for example due to wear of a transport unit Tn, which can also require more electrical power for the movement of the transport unit Tn.

Due to the geometry of the transport path in space and the kinematics of the movement (movement profiles) of the transport unit Tn, caused by the driving forces, and due to the mass of the transport unit Tn and the product conveyed thereon, as well as due to the position of the product (center of gravity) on the transport unit Tn, in addition to the driving forces, external forces (which also include moments) also act on the transport unit Tn. A centrifugal force in a curve, for example, and also a weight force that varies over time, or the like, is considered to be an external force. Process forces in a processing station 6 can also act on the transport unit Tn as external forces, i.e., forces which occur in a processing station 6 as a result of processing of a product moved by a transport unit Tn. The mass of the transport unit Tn and the conveyed product (if present), as well as the position of the product on the transport unit Tn, is known. During the entire movement of the transport unit Tn, it has to be ensured that the movement profile can actually be produced by means of the possible driving forces. It also has to be ensured that the transport unit Tn is not undesirably lifted-off from the stator 2 or even that it does not fall off the stator 2 due to the acting external forces.

Since the movement profiles of all the transport units Tn moving on the transport device 1 are generally not known in advance, but are obtained only during the operation of the transport device 1 in order to produce the product flow, it is not possible to reliably estimate when the transport device 1 is started-up whether the transport device configuration actually permits the desired operation.

Therefore, for starting-up a transport device 1 in the form of a (linear or planar) long-stator linear motor, the mechanical design and/or the thermal design and/or the electrical design of the long-stator linear motor 1 is checked.

To do this, the desired product flow can first be simulated for a particular simulation duration. The simulation duration should be selected to be sufficiently long in order to obtain the best possible picture of the load on the transport device 1. For example, the simulation could be carried out until a specified number of products have passed through the product flow. Depending on the application and product flow, this can be several hundred, several thousand or even more or fewer products. Likewise, a simulation duration could be selected that corresponds to a particular time span in real operation, for example one day of real operation of the transport device 1. The simulation can also include only one particular state of the transport device 1, for example an emergency stop followed by a restart, or a particular error case, for example the failure of a particular branch or a particular processing station 6. A person skilled in the art is in any case able to determine a suitable simulation duration for the relevant simulation case.

When simulating the product flow, the movements of the transport units Tn along the possible transport path are simulated under the same conditions as in real operation. It should be noted here that in the case of two simulations of the product flow, the movements of the transport units Tn will usually not be the same due to the above explanations. The simulation can be carried out using the known geometry of the stator 2 and the resulting movement profiles of the transport units Tn, with higher-level controls, such as switch arbitration, collision avoidance, path control (e.g., when a position can be reached by different routes), selection of a processing station, etc., ensuring the execution of the product flow in the simulation as in real operation. During the simulation, the system control unit 5 and also the control unit 4 can remain the same or can be replaced by the simulation. In the simulation, the kinematic state of the transport unit Tn (primarily the position on the transport path, speed, acceleration, etc.) is determined in each time step of the simulation at the end of the current time step of the simulation (usually in the millisecond range). The electrical control variables for the drive coils AS involved in the movements of the transport units Tn are also simulated for each time step of the control.

The simulation can largely be carried out in the same way as in real operation. For example, the target movement variables of the transport units Tn are determined in each time step of the simulation in order to implement the specified process flow. The target movement variables specify the desired kinematic state (position, speed, acceleration, etc.) of each involved transport unit Tn at every point in time of the control. The number of simulated transport units Tn preferably corresponds to the number provided for real operation. The target movement variables of the transport units Tn should be optimally set at the end of the time step by the control. The control unit 4 can, using the implemented controller or by means of the simulation of the control unit, determine the electrical control variables for energizing the drive coils AS from the target movement variables in order to set these target movement variables. If actual variables are required for this purpose, these can be obtained from a model of the long-stator linear motor. The model can, for example, determine the resulting kinematic state of a transport unit Tn when the drive coils AS are energized with the electrical control variables of the last time step of the control. In detail, the acting drive magnetic field could be determined using the electrical control variables, and from this the acting driving forces can be determined, from which the acceleration acting on the transport unit Tn and position change follow in turn. The resulting position then corresponds to the actual position. For this purpose, a mechanical model can also be required in order to determine other forces acting on the transport unit Tn, for example frictional forces, guiding forces, external forces, etc. The simultaneous use of a plurality of models can be implemented by known co-simulation methods. The actual variables for the current time step of the control can be obtained from this. In a simplified approach, the target movement variables of the previous time step of the simulation can also be used as actual variables for controlling the movement in the control unit 4. In this way, the required acceleration and driving force could be determined, as well as the electrical control variables required therefor. The electrical control variables can then be determined for each time step of the control, preferably in such a way that the difference between the current target movement variable and the actual variable is as small as possible. For this purpose, the same control law is preferably used in the control unit 4 in the simulation as in real operation of the transport device 1.

The movements of the transport units Tn involved in the implementation of the product flow can thus be described equally in the form of a movement profile (e.g., speed over time or position) for each transport unit Tn, or, for each transport unit Tn, in the form of a time sequence of target movement variables for each time step of the control, or in the form of a time sequence of electrical control variables of the drive coils AS over the simulation duration for each time step of the control.

The description of the movements of the transport units Tn can, however, also be known or specified. For example, the description of the movements of the transport units Tn can already have been simulated and can now be used again to carry out the starting-up of the transport device 1.

For the starting-up of the transport device 1, the thermal design (e.g., cooling) and/or the mechanical design (e.g., acting forces and moments) and/or the electrical design (e.g., electrical power supply to the drive coils and/or the design of the power electronics) is checked using the description of the movements of the transport units Tn. This means that a thermal state of at least a part of the transport device and/or a mechanical state of at least a part of the transport device and/or an electrical state of at least a part of the transport device is determined, and it is checked if the determined thermal state can be implemented by the thermal configuration of the transport device configuration TK and/or the determined electrical state can be implemented by the electrical configuration of the transport device configuration TK and/or the determined mechanical state can be implemented by the mechanical configuration of the transport device configuration TK. This check is carried out on the basis of the description of the movements of the transport units Tn in a checking unit 11, generally using suitable software and/or existing models of various parts of the transport device 1.

To check the thermal design, a thermal model of the stator 2 can be used, by means of which the heating of the stator 2 or of an individual drive coil AS is determined from the electrical control variables for the drive coils AS involved in the movements of the transport units Tn. Iron losses in the stator 2, speed-dependent losses or losses to overcome the cogging forces can also be taken into account. The heating is determined at least on a part of the stator 2, preferably on the entire stator 2, or even on only a single drive coil AS. The thermal model can also determine the heating of other parts of the long-stator linear motor that can be assigned to the stator 2 for the thermal design, for example the power electronics, a control unit 4, etc. The heating of such parts can thus also be checked. From the electrical control variables, the power loss and thus the heat supplied to the stator 2 can be determined for each drive coil AS in each time step of the check (which can correspond to the time step of the control). The heat dissipation at the stator 2 can also be determined by the thermal model in each time step of the check. The heat can be dissipated by heat conduction into a surrounding component part, heat radiation to the surroundings, convection through the surrounding air and/or by an active cooling 7 (if provided). The heat supply and heat dissipation from other parts of the stator 2 can also be determined in this way. From this, the temperature of the stator 2, or of a part thereof, or a particular drive coil AS, can be determined in each time step of the check. For this purpose, the stator 2 is preferably locally discretized, for example into stator sections which correspond to the width of a drive coil AS. For the check, a maximum permissible temperature of the stator 2 or of a drive coil AS can be specified in the transport device configuration as part of the thermal configuration. Different maximum temperatures can also be specified at different points on the stator 2. For example, the permissible temperature in a switch W can be lower than outside a switch. If the determined temperature of the stator 2 or of a drive coil AS exceeds the permissible temperature, a problem with the thermal design is identified. It is possible, that the permissible temperature of a transport section is maintained, but the permissible temperature is exceeded at a particular drive coil AS of the transport portion. Instead of a temperature, other thermal variables can of course also be used for the assessment, for example a total amount of heat supplied.

To check the electrical design, the electrical state of at least one part of the transport device 1 can also be determined from the electrical control variables for each of the drive coils AS in each time step of the check. For example, the electrical power required for operation can be determined as the electrical state. It can thus be determined for each power supply section VAi in each time step of the check whether the power $P_{maxi}$ that can be provided by the assigned feed source EQi is sufficient in accordance with the transport device configuration. Electrical losses can also be taken into account here, such as a voltage drop over a connecting line for connecting a feed source EQi to a power supply section VAi.

In the check of the electrical design, particular electrical variables of the power electronics can be determined as the electrical state in each time step of the check, for example an electrical current flowing through a particular part (such as a semiconductor switch) or an electrical current flowing through a particular component (such as a current balancer). This can be carried out using a suitable mathematical model of the power electronics. It is thus also possible to check whether the configuration of the power electronics in the transport device configuration (for example in the form of the built-in electrical parts and switching circuits) is sufficient to produce the movements of the transport units Tn. The mathematical model can, for example, process the electrical control variables as input and determine electrical variables of interest produced thereby at particular points in the power electronics.

The check of the electrical design can also include the check as to whether a provided computing capacity, for example of the control unit 4, is sufficient for the operation of the transport device 1 for implementing the product flow.

To check the mechanical design, the movement forces (which can also include moments) that are produced by the movement and act on the transport unit Tn can be determined as the mechanical state for each time step of the check from the movement profile of each transport unit Tn and the known geometry of the transport path, as well as the known mass of the transport unit Tn and the conveyed product (if present) and the known geometry of the transport unit Tn (geometry of the guide devices, the product receptacle, etc.). This can also include external forces such as frictional forces, process forces, guiding forces, holding forces, forces of attraction, centrifugal forces, etc. The driving forces acting on the transport unit Tn due to the drive magnetic field can be determined from the electrical control variables, or can be ascertained indirectly via the accelerations of the transport unit Tn if the actual variables are known. The attractive force acting between the drive magnets on the transport unit Tn and parts of the stator 2 is also known from the known structure of the transport device 1. In this way, it is possible to check, for example, whether the transport unit Tn can be held on the transport device 1 at every time step of the check, for example by means of acting holding forces due to the provided mechanical guide or due to the acting magnetic force of attraction between the drive magnets on the transport unit Tn and parts of the stator 2, or due to generated driving forces (for example transverse to the direction of movement of a linear long-stator linear motor) that hold the transport unit Tn on the stator. Since the guide structure on the stator 2 and on the transport unit Tn is known, it is also known what forces can be absorbed thereby (holding forces). It is also possible to check whether the possible driving forces are sufficient to ensure the movement of the transport units Tn despite acting process forces.

Essentially, when checking the mechanical design, it is thus checked whether an intended movement of a transport unit Tn can be produced on the basis of the sum of all of the forces acting on the transport unit Tn (which can also include moments), or whether a force specification (which also includes a moment specification) as part of the mechanical configuration of the transport device configuration is violated. A force specification can, for example, be a permissible force in a particular direction in space, which force must not be exceeded.

If a problem in the thermal design, the mechanical design or the electrical design is identified by the simulation, the transport device configuration TK is changed. The check can then be repeated, if necessary, until no more problems occur. In this way, the transport device 1 can be put into operation safely.

To repeat the check, an already determined description of the movements of the transport units Tn can be used, for example the same as in the previous check. However, the product flow can also be re-simulated and a new description of the movements of the transport units Tn can be obtained therefrom for the check.

The geometry of the stator 2 or a transport unit Tn of the transport device 1 could be changed in the transport device configuration. However, since the transport device 1 has often already been constructed or planned, it is often undesired to change anything in the geometry of the stator 2 or of a transport unit Tn. However, the geometry or position of a product receptacle of a transport unit Tn could also be changed in order to influence the resulting forces. By changing the geometry, it is possible in any case to influence the mechanical design in order to change the acting forces at particular points on the transport path, e.g., to reduce said forces, for example by means of larger curve radii, or by shifting a product center of gravity on the transport unit Tn. The geometry of the stator 2 can, however, also influence the thermal design, for example the required driving forces can be reduced if a slope of a transport portion is reduced.

The cooling concept can also be changed in the transport device configuration TK. For example, the cooling 7 of a cooling section KA can be changed if the cooling 7 is not sufficient. A further cooling section KA can also be added if it is identified that a particular part of the stator 2 is thermally problematic. However, the simulation can also reveal that a provided cooling section KA is superfluous and the cooling 7 of the cooling section KA can be removed or made smaller.

The electrical power supply can also be changed in the transport device configuration TK. For example, a larger feed source EQi can be provided, or a power supply section VAi could be made smaller, or the assignment of the power supply sections VAi to the feed sources EQi could be changed. For example, a stator module Sm could be moved from one power supply section VAi to another. However, the simulation can also be used to identify that fewer feed sources EQi will suffice. The wiring can also be changed.

The configuration of power electronics can also be changed, for example by selecting larger or more powerful electrical parts, if it turns out that the movements of the transport units Tn cannot be implemented with the envisaged power electronics. Likewise, the computing capacity of a control unit 4 could be increased, or fewer drive coils AS could be assigned to a control unit 4 for the control.

Last but not least, a movement parameter of a transport unit Tn could also be changed in the transport device configuration. For example, a permissible speed in a curve having a particular curve radius could be reduced or a permissible maximum speed or permissible acceleration of a transport unit Tn could be decreased. By changing a movement parameter, in particular the thermal state, the electrical state and the mechanical state can be influenced. For example, lower permissible accelerations require lower electrical control variables, thus fewer losses in the drive coils AS and less heating, thus less power consumption and also lower forces and moments acting on a transport unit Tn and also lower electrical currents in the power electronics.

Of course, multiple of the above-mentioned changes to the transport device configuration can also be made.

How the transport device configuration Tk is changed can be left to a person skilled in the art. However, it is also possible for the checking software to make recommendations for a change on the basis of the problems identified or to automatically make changes to the transport device configuration TK using provided algorithms or rules.

Figure 2:
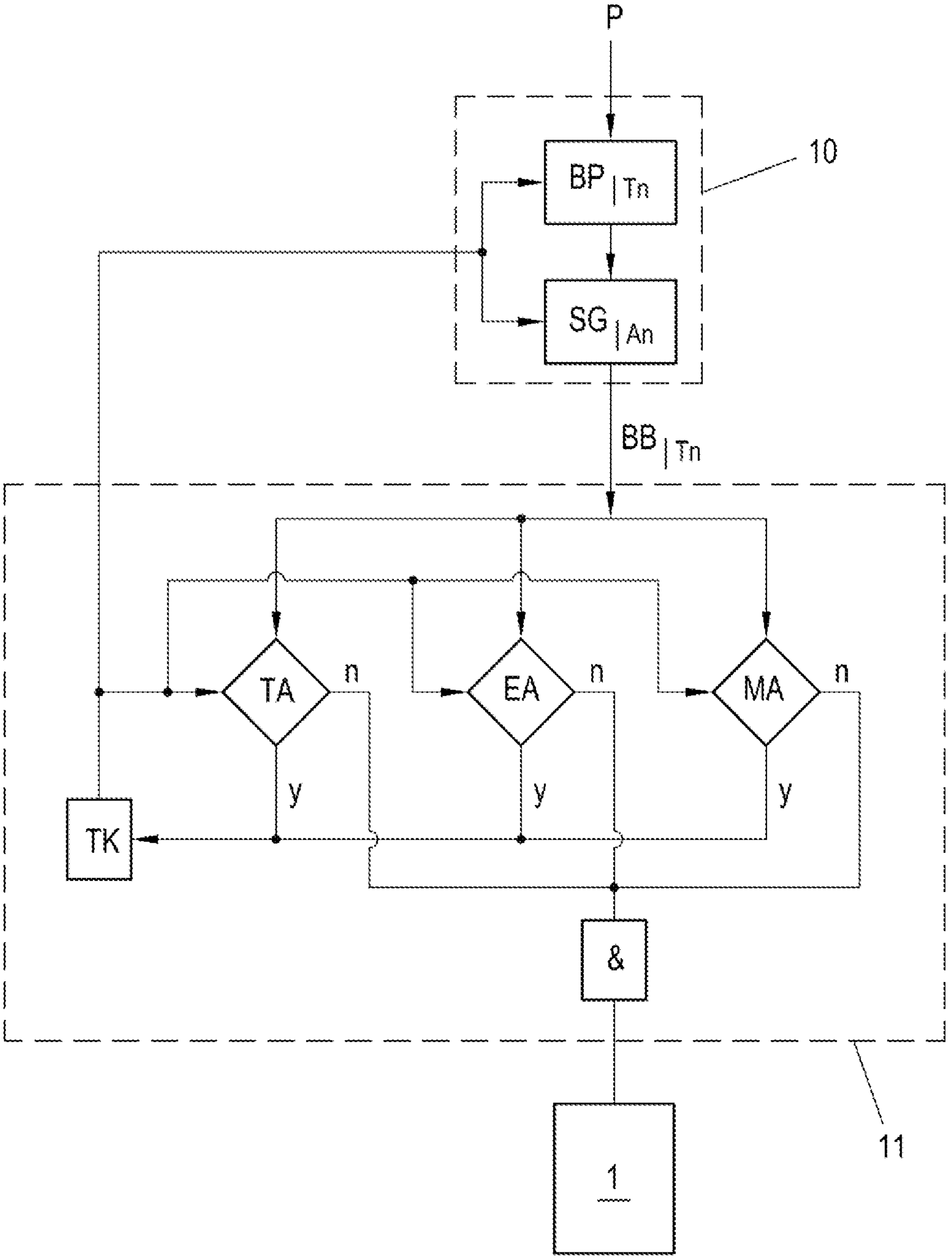

The start-up of a transport device 1 could therefore proceed as explained below with reference to FIG. 2.

At the start, the descriptions of the movements $BB_{|Tn}$ of the transport units Tn involved in the implementation of a specified product flow P can optionally be determined. For this purpose, the movement profiles $BP_{|Tn}$ of the transport units Tn involved for implementing the product flow P can be determined by simulation. The electrical control variables $SG_{|An}$ of the drive coils AS of the long-stator linear motor 1 can also be determined for the implementation of the product flow P for each time step of the control. This can be carried out on a suitable simulation unit 10, such as computer hardware with suitable simulation software. The specifications of a transport device configuration TK, for example for the geometry of the transport device 1, can also be used for this purpose. Alternatively, the descriptions of the movements $BB_{|Tn}$ of the transport units Tn are known or are specified.

The mechanical design MA of the transport device 1 and/or the electrical design EA of the transport device 1 and/or the thermal design TA of the transport device 1 is checked in a checking unit 11 as explained above using the descriptions of the movements $BB_{|Tn}$ of the transport units Tn, which descriptions are in the form of the time course (usually discretized in the time step of the control) of the electrical control variables $SG_{|An}$ of the drive coils AS of the long-stator linear motor or in the form of the time course of the target movement variables (usually discretized in the time step of the control) or in the form of the movement profiles $BP_{|Tn}$ (usually discretized in the time step of the control). If necessary, the electrical control variables $SG_{|An}$ of the drive coils AS of the long-stator linear motor for implementing the product flow P are determined in the checking unit 11 at each time step of the check, if these are not included in the descriptions of the movements $BB_{|Tn}$ of the transport units Tn. The current transport device configuration TK is also used for the check. In order to check the mechanical design MA of the transport device 1 and/or the electrical design EA of the transport device 1 and/or the thermal design of the transport device 1, for each time step of the check for at least one part of the transport device 1, a mechanical state of this part and/or electrical state of this part and/or a thermal state is determined, and it is checked whether the mechanical, electrical and/or thermal state can be implemented by the current transport device configuration TK. If a problem in the operation of the transport device 1 is identified during the check, the transport device configuration TK is changed as explained above (path "y") and the check can be repeated if necessary. If no problem can be identified (path "n"), this being indicated by the logical "AND" link (symbol "&" in FIG. 2), then the transport device 1 can be operated with the current transport device configuration Tk in order to implement the product flow. The check is carried out on a checking unit 11, for example computer hardware with suitable checking software, it being possible for the simulation unit 10 and the checking unit 11 also to be integrated in a computer unit. If the check is repeated, the descriptions of the movements $BB_{|Tn}$ of the transport units Tn could also be re-determined or re-specified.

The invention claimed is:

1. A method for starting-up a transport device in the form of a long-stator linear motor having a plurality of drive coils which are arranged on a stator and a plurality of transport units which are moved simultaneously along the stator during operation, the plurality of transport units including a transport unit being used to convey a product, and a specified product flow being produced by the transport device by creating, using specified rules for the movements of the transport units during the operation of the transport device, movement profiles of the movements of the transport units along the stator for producing the product flow, the method comprising:

a) specifying an initial transport device configuration of the transport device, having a specified mechanical configuration of the transport device and/or a specified thermal configuration of the transport device and/or a specified electrical configuration of the transport device;

b) specifying a description of the movements of the transport units for implementing the product flow via the transport device, the description of the movements of the transport units including a time course of electrical control variables of the drive coils, or a time course of electrical control variables of the drive coils being determined from the description of the movements of the transport units;

c) using the time course of the electrical control variables of the drive coils in a checking unit in order to determine a thermal state of at least one part of the transport device and to check whether the thermal state of this at least one part of the transport device can be implemented by a current thermal configuration, and/or in order to determine an electrical state of at least one part of the transport device and to check whether the electrical state of this at least one part of the transport device can be implemented by a current electrical configuration, and/or in order to determine a mechanical state of at least one transport unit of the transport device and to check whether the mechanical state of this at least one transport unit can be implemented by a current mechanical configuration;

d) changing at least one of the specified mechanical, thermal and/or electrical configuration of the transport device if the thermal state or the electrical state or the mechanical state cannot be implemented due to the specified transport device configuration; and e) starting up the operation of the transport device with a determined transport device configuration, in which the thermal state, the electrical state and/or the mechanical state can be implemented.

2. The method according to claim 1, wherein the time course of the electrical control variables of the drive coils is specified by simulating the movements of the transport units for producing the product flow and, in the process, determining the electrical control variables of the drive coils required to implement the movements.

3. The method according to claim 1, wherein at least c) and d) are repeated until the product flow can be implemented with a current transport device configuration.

4. The method according to claim 3, wherein b) is also repeated.

5. The method according to claim 1, wherein the thermal configuration includes a specification for a cooling of the stator and, in order to check the thermal configuration, heating of at least one part of the stator or of at least one drive coil is determined on the basis of the specified time course of the electrical control variables of the drive coils of this part of the stator or of the at least one drive coil, and it is checked whether the cooling of the stator provided in the thermal configuration is sufficient to keep the heating of this part of the stator or of the at least one drive coil below a permissible level of heating.

6. The method according to claim 1, wherein the electrical configuration includes a specification for electrical feed sources for supplying electric power to the drive coils and/or a configuration of power electronics for generating electrical control variables of the drive coils, and in order to check the electrical configuration a required electrical feed power is determined on the basis of the specified time course of the electrical control variables of the drive coils, and it is checked whether the electrical feed sources provided in the electrical configuration are sufficient to supply electrical power to the drive coils, and/or an electrical variable of a part or of a component of the power electronics occurring due to the specified time course of the electrical control variables of the drive coils is determined, and it is checked whether the electrical variable can be produced by the electrical configuration of the power electronics.

7. The method according to claim 1, wherein the mechanical configuration includes a specification for a geometry of the stator and/or a specification of permissible movement parameters of the transport units and/or a force specification of the transport units, and, in order to check the mechanical configuration, a sum of forces that act on a transport unit during movement of the transport unit for implementing the product flow is determined, and it is checked whether a force specification of the transport device configuration is violated.

* * * * *